US010779057B2

(12) United States Patent
Mandyam et al.

(10) Patent No.: US 10,779,057 B2
(45) Date of Patent: Sep. 15, 2020

(54) BROADCAST CONTENT REDISTRIBUTION AND AD INSERTION

(71) Applicant: QUALCOMM Incorporated, San Diego, CA (US)

(72) Inventors: Giridhar Mandyam, San Diego, CA (US); Gordon Kent Walker, Poway, CA (US); Charles Nung Lo, San Diego, CA (US); Thomas Stockhammer, Bergen (DE)

(73) Assignee: Qualcomm Incorporated, San Diego, CA (US)

( * ) Notice: Subject to any disclaimer, the term of this patent is extended or adjusted under 35 U.S.C. 154(b) by 399 days.

(21) Appl. No.: 15/160,395

(22) Filed: May 20, 2016

(65) Prior Publication Data

US 2016/0360288 A1 Dec. 8, 2016

Related U.S. Application Data

(60) Provisional application No. 62/172,688, filed on Jun. 8, 2015.

(51) Int. Cl.
*H04N 7/025* (2006.01)
*H04N 21/81* (2011.01)
(Continued)

(52) U.S. Cl.
CPC ........... *H04N 21/812* (2013.01); *H04L 67/02* (2013.01); *H04L 67/2842* (2013.01);
(Continued)

(58) Field of Classification Search
CPC ............. H04N 21/4722; H04N 21/478; H04N 21/488; H04N 21/8358; H04N 21/8586;
(Continued)

(56) References Cited

U.S. PATENT DOCUMENTS

| 6,075,576 A | 6/2000 | Tan et al. |
| 2006/0039413 A1* | 2/2006 | Nakajima ................ H04J 3/22 370/521 |

(Continued)

FOREIGN PATENT DOCUMENTS

| CN | 104412609 A | 3/2015 |
| JP | H11161664 A | 6/1999 |

(Continued)

OTHER PUBLICATIONS

International Search Report and Written Opinion—PCT/US2016/033739—ISA/EPO—dated Aug. 10, 2016.

*Primary Examiner* — Jivka A Rabovianski
(74) *Attorney, Agent, or Firm* — Norton Rose Fulbright US LLP

(57) ABSTRACT

Systems and methods for handling and outputting broadcast content and secondary content based on metadata embedded in the broadcast content are provided. Embodiments may include receiving broadcast content, wherein the received broadcast content includes metadata embedded into the broadcast content. Embodiments may also include decoding the broadcast content to extract the metadata from the broadcast content and outputting the broadcast content in collaboration with the extracted metadata.

24 Claims, 6 Drawing Sheets

(51) Int. Cl.
*H04N 21/61* (2011.01)
*H04L 29/08* (2006.01)
*H04N 21/478* (2011.01)
*H04N 21/488* (2011.01)
*H04N 21/43* (2011.01)
*H04N 21/4722* (2011.01)
*H04N 21/8358* (2011.01)
*H04N 21/858* (2011.01)
*H04N 21/242* (2011.01)
*H04N 21/462* (2011.01)

(52) U.S. Cl.
CPC ....... *H04N 21/242* (2013.01); *H04N 21/4302* (2013.01); *H04N 21/4622* (2013.01); *H04N 21/478* (2013.01); *H04N 21/4722* (2013.01); *H04N 21/488* (2013.01); *H04N 21/6175* (2013.01); *H04N 21/8358* (2013.01); *H04N 21/8586* (2013.01)

(58) Field of Classification Search
CPC ............ H04N 21/4302; H04N 21/242; H04N 21/4622; H04N 21/2668
See application file for complete search history.

(56) References Cited

U.S. PATENT DOCUMENTS

| | | | | |
|---|---|---|---|---|
| 2011/0125594 A1* | 5/2011 | Brown | ................. | G06Q 30/02 705/14.73 |
| 2012/0013746 A1* | 1/2012 | Chen | ................... | G11B 27/034 348/180 |
| 2013/0077934 A1 | 3/2013 | Kanazawa et al. | | |
| 2014/0013374 A1 | 1/2014 | Oh et al. | | |
| 2014/0059630 A1 | 2/2014 | Kim et al. | | |
| 2014/0150019 A1* | 5/2014 | Ma | .................... | G06Q 30/0251 725/34 |
| 2014/0195358 A1* | 7/2014 | Beining | ............... | H04N 21/812 705/14.73 |
| 2014/0325565 A1* | 10/2014 | Mangat | .............. | H04N 21/4316 725/43 |
| 2014/0373054 A1* | 12/2014 | Edwards | ............. | H04N 21/458 725/37 |
| 2017/0339374 A1* | 11/2017 | Eyal | ................... | H04N 21/8352 |

FOREIGN PATENT DOCUMENTS

| | | |
|---|---|---|
| JP | 2002077572 A | 3/2002 |
| JP | 2003219374 A | 7/2003 |
| JP | 2004221872 A | 8/2004 |
| JP | 2007124700 A | 5/2007 |
| JP | 2012198900 A | 10/2012 |
| JP | 2013513329 A | 4/2013 |
| WO | WO-2014014252 A1 | 1/2014 |
| WO | WO-2014084570 A1 | 6/2014 |

* cited by examiner

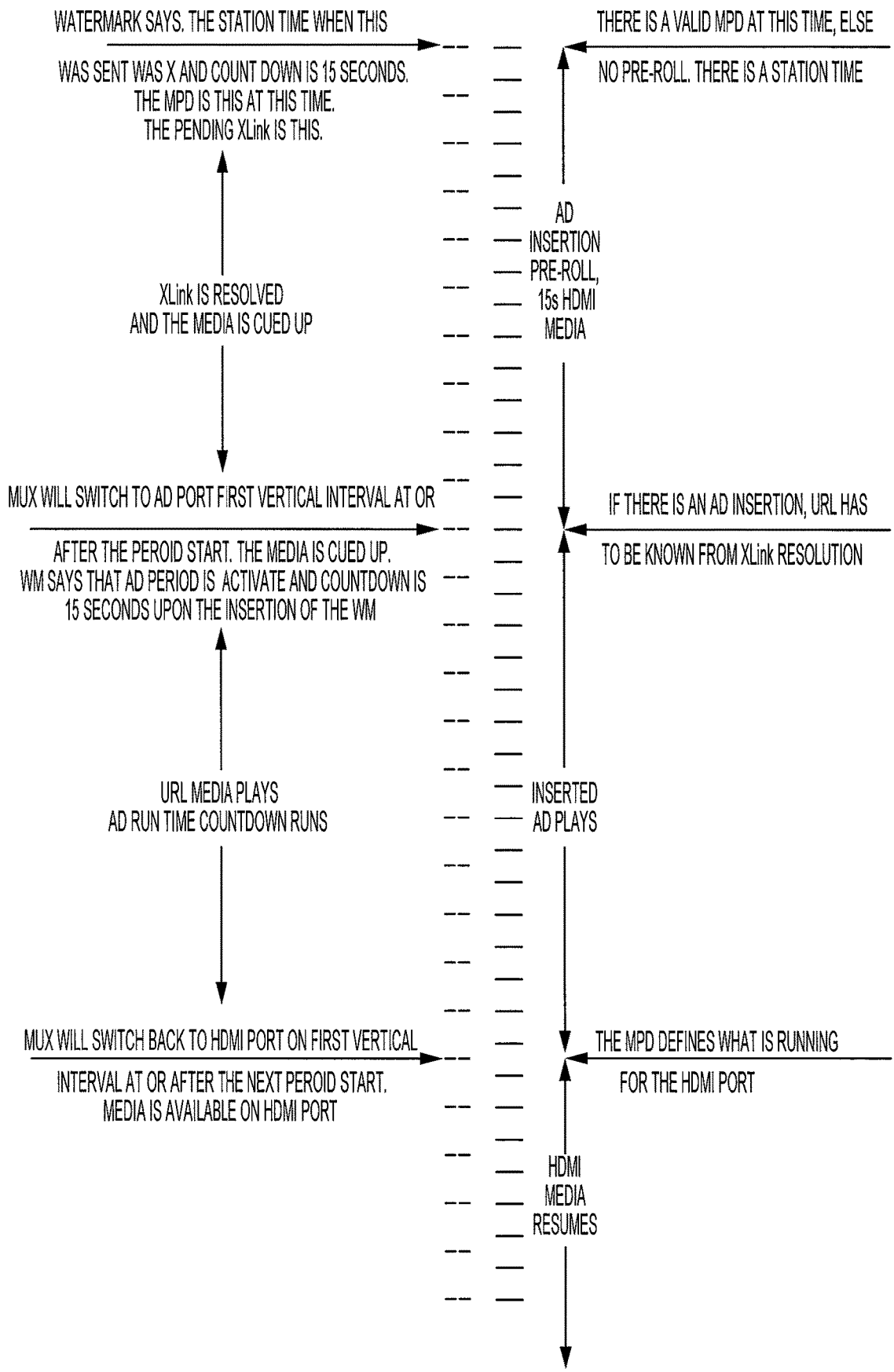

BROADCAST CONTENT REDISTRIBUTION AND AD INSERTION

CROSS-REFERENCE TO RELATED APPLICATIONS

This application claims the benefit of U.S. Provisional Patent Application No. 62/172,688 entitled, "BROADCAST CONTENT REDISTRIBUTION AND AD INSERTION", filed on Jun. 8, 2015, which is expressly incorporated by reference herein in its entirety.

FIELD

This disclosure generally relates to the display of redistributed broadcast content. More specifically, this disclosure relates to the handling and collaborative outputting of redistributed broadcast content and advertisements based on metadata embedded in the redistributed broadcast content.

BACKGROUND

Media content providers normally broadcast content over the air to be picked up by Multichannel Video Programming Distributors (MVPDs), such as cable or satellite service providers, for redistribution to the MVPD's customers. The media content is typically broadcast in a specific wireless communication band. Data associated with the media content, such as metadata, is typically sent with the media content except that the metadata is typically sent separately or not at all. However, MVPDs are only obligated to carry the video, audio, and closed captions, and they generally refuse to carry broadcasted metadata associated with the broadcasted media content. Therefore, when MVPD set top boxes tune to a particular communication media stream to pick up the media content broadcasted within the band, they typically disregard and do not receive the out-of-band data, i.e., data outside the communication band in which the media content is streaming. As a result, the out-of-band metadata associated with the media content is usually lost and not available to the end device that outputs the media content.

SUMMARY

According to one embodiment, enhanced media redistribution for collaborative outputting of redistributed broadcast content and advertisements based on metadata embedded in the redistributed broadcast content may be employed with an end device receiver configured in accordance with the systems and methods disclosed herein. In one embodiment, a method for handling and outputting broadcast content and secondary content based on metadata embedded in the broadcast content may include receiving, by a computing device, broadcast content, wherein the received broadcast content includes metadata embedded into the broadcast content. The method may also include decoding, by the computing device, the broadcast content to extract the metadata from the broadcast content. The method may further include outputting, by the computing device, the broadcast content in collaboration with the extracted metadata.

According to another embodiment, computer program product for handling and outputting broadcast content and secondary content based on metadata embedded in the broadcast content may include a non-transitory computer-readable medium comprising instructions which, when executed by a processor of a computing system, cause the processor to perform the step of receiving broadcast content, wherein the received broadcast content includes metadata embedded into the broadcast content. The medium may also include instructions which, when executed by a processor of a computing system, cause the processor to perform the step of decoding the broadcast content to extract the metadata from the broadcast content. The medium may further include instructions which, when executed by a processor of a computing system, cause the processor to perform the step of outputting, by the computing device, the broadcast content in collaboration with the extracted metadata.

According to yet another embodiment, an apparatus for handling and outputting broadcast content and secondary content based on metadata embedded in the broadcast content may include means for receiving broadcast content, wherein the received broadcast content includes metadata embedded into the broadcast content. The apparatus may also include means for decoding the broadcast content to extract the metadata from the broadcast content. The apparatus may also include means for outputting, by the computing device, the broadcast content in collaboration with the extracted metadata.

The foregoing has outlined rather broadly the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiments disclosed may be readily utilized as a basis for modifying or designing other structures for carrying out the same purposes of the present disclosure. It should also be realized by those skilled in the art that such equivalent constructions do not depart from the spirit and scope of the disclosure as set forth in the appended claims. The novel features which are believed to be characteristic of the disclosure, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

For a more complete understanding of the disclosed system and methods, reference is now made to the following descriptions taken in conjunction with the accompanying drawings.

FIG. 4B shows a playback (output) time line of primary media content and secondary content according to one embodiment of the present disclosure.

DETAILED DESCRIPTION

Figure 1:
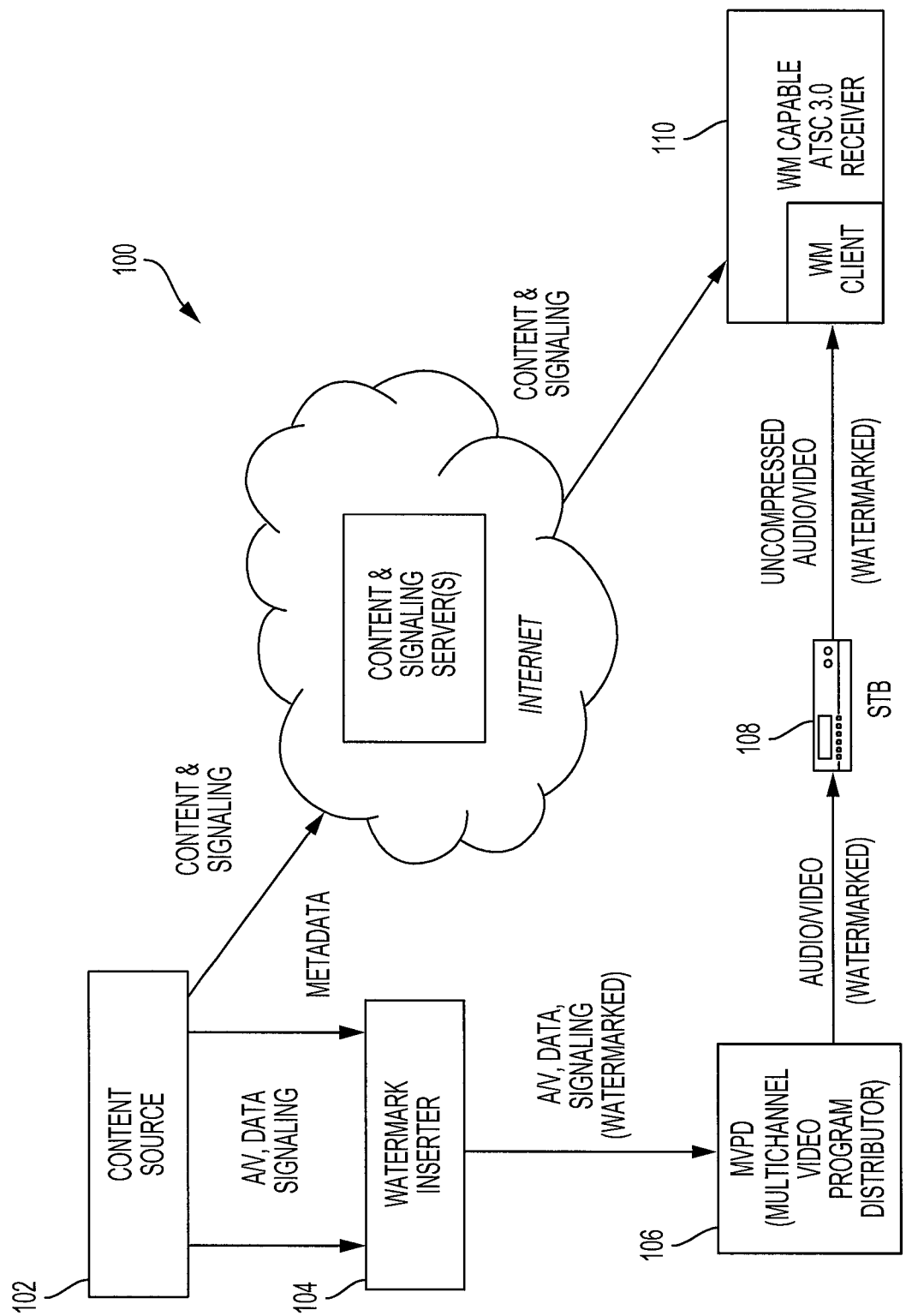
FIG. 1 shows a system adapted for transmission of media content and metadata according to one embodiment of the present disclosure.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

The word "exemplary" is used herein to mean "serving as an example, instance, or illustration." Any aspect described herein as "exemplary" is not necessarily to be construed as preferred or advantageous over other aspects.

In this description, the term "application" may also include files having executable content, such as: object code, scripts, byte code, markup language files, and patches. In addition, an "application" referred to herein, may also include files that are not executable in nature, such as documents that may need to be opened or other data files that need to be accessed.

As used in this description, the term "content" may include data having video, audio, combinations of video and audio, or other data at one or more quality levels, the quality level determined by bit rate, resolution, or other factors. The content may also include executable content, such as: object code, scripts, byte code, markup language files, and patches. In addition, "content" may also include files that are not executable in nature, such as documents that may need to be opened or other data files that need to be accessed.

As used in this description, the term "streaming content" refers to content that may be sent from a server device and received at a user device according to one or more standards that enable the real-time transfer of content or transfer of content over a period of time. Examples of streaming content standards include those that support de-interleaved (or multiple) channels and those that do not support de-interleaved (or multiple) channels.

As used in this description, the terms "component," "database," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

As used herein, the terms "user equipment," "user device," and "client device" include devices capable of requesting and receiving content from a server, such as, for example, a web server, and transmitting information to the server. Such devices can be stationary devices or mobile devices. The terms "user equipment," "user device," and "client device" can be used interchangeably.

As used herein, the term "user" refers to an individual receiving content on a user device or on a client device and transmitting information via the client device.

Systems and methods disclosed herein allow end devices with media content outputting capabilities, such as television sets, computers, and mobile electronic devices, to access metadata associated with media content and generated by original content providers to provide enhanced media distribution and consumption. Providing end devices with access to the original metadata associated with broadcasted media content yields numerous advantages to content providers and customers. For example, embodiments of this disclosure allow broadcasters (content providers) to insert secondary content, such as an advertisement or other media content, based on information in the metadata. In operation according to embodiments, insertion of secondary content may, for example, provide personalized ad insertion whereby an end device plays advertising content personalized to a user of the end device using information in the metadata.

In some embodiments, metadata may include location information specifying where secondary content to be output in collaboration with the broadcast (media) content is located and timing information specifying the time when the secondary content is to be output. Based on the metadata provided by the content provider, the end device may insert secondary content, such as a targeted advertisement, at a pre-determined time instant specified by the metadata so that the secondary content is output instead of the primary media content in accordance with the metadata.

Because the end device may have access to the metadata generated by the content provider, the metadata may serve as a means of direct interaction between the content provider and the end device regarding how the primary media content is to be displayed. In addition, content providers may collaborate directly with the end device manufacturers to ensure that the metadata can be processed by the end devices correctly and that the end devices are capable of performing actions specified in the metadata, such as retrieving secondary content and outputting the secondary content instead of the primary media content.

FIG. 1 shows a system 100 adapted for transmission of media content and metadata according to one embodiment of the present disclosure. The system 100 includes the content source 102 which includes the media content provided by the content provider. The media content provided by the content provider may include audio, visual, and general data, such as signaling data and closed captioning data. The content may also include metadata associated with media content.

The system 100 also includes a watermark inserter 104 and an MVPD 106. The watermark inserter 104 may include hardware, software, or both hardware and software which is configured to embed metadata into associated media content prior to the media content being broadcasted (e.g., to include the metadata within the content or payload data of the media). Therefore, in some embodiments, the watermark inserter 104 may serve as the means by which metadata may be broadcasted with the media content without being disassociated from the media content when an MVPD 106 retrieves the watermarked media content. In some embodiments, the watermark inserter may reside on the transmit side of a communication network. Therefore, in one embodiment, the watermark inserter 104 may be a component operated by a content provider to process its media content and metadata before broadcasting the content. In another embodiment, the watermark inserter 104 may be a component part of an intermediate system that receives the broadcast content and the associated metadata and processes the two to create the watermarked broadcast content.

In order to watermark the broadcast content, the watermark inserter 104 may process uncompressed broadcast content and associated metadata. Uncompressed broadcast content may include broadcast content not yet encoded for transmission. Therefore, in some embodiments, the watermark inserter 104 may operate to watermark the broadcast content by embedding the metadata in the uncompressed broadcast content prior to the broadcast content being encoded from transmission over air waves. The watermark inserter 104 is not limited to a particular means for embedding, and in general may incorporate various schemes to perform the digital watermarking. For example, in one embodiment, the watermark inserter 104 may watermark the broadcast content by embedding the metadata into the least significant bits (LSBs) of image pixel data of the broadcast content. In another embodiment, the watermark inserter 104 may watermark the broadcast content by embedding the metadata into the audio phase data of the broadcast content. In yet another embodiment, the watermark inserter 104 may watermark the broadcast content by embedding the metadata into unviewable parts of the video data of the broadcast content. In some embodiments, the watermark may be used to convey the metadata or to enable a redirection that results in obtaining the metadata.

In some embodiments, after the broadcast content has been watermarked, the watermarked broadcast content may be compressed and encoded for broadcast transmission over a communication band. As shown in FIG. 1, the MVPD 106 may receive the watermarked broadcast content for redistribution to its customers. To facilitate the redistribution and prepping of data for rendering by an end device 110, system 100 also includes a set top box (STB) 108 configured to receive data from an MVPD 106. In many embodiments, each MVPD 106 may have its own proprietary STB 108 to receive data sent from the MVPD 106. The STB 108 may decode and uncompress the broadcast content transmitted to it from the MVPD 106 and retransmit the uncompressed and decoded broadcast content to an end device 110 for outputting by the end device 110. Because the broadcast content was embedded with the metadata before being compressed and encoded, the uncompressed and decoded broadcast content transmitted to the end device 110 may include the broadcast content and the associated metadata.

Although FIG. 1 indicates that the end device 110 is Advanced Television Systems Committee (ATSC) 3.0 capable, the end device 110 need not be ATSC 3.0. End devices not ATSC 3.0 capable may also be serve as an end device operating in accordance with embodiments of this disclosure. In general, an end device may be any computing device, stationary or mobile, capable of receiving media content so long as the computing device supports the functions of end devices disclosed herein. As an example, and not limitation, in one embodiment the end device may be a television receiver.

Figure 2:
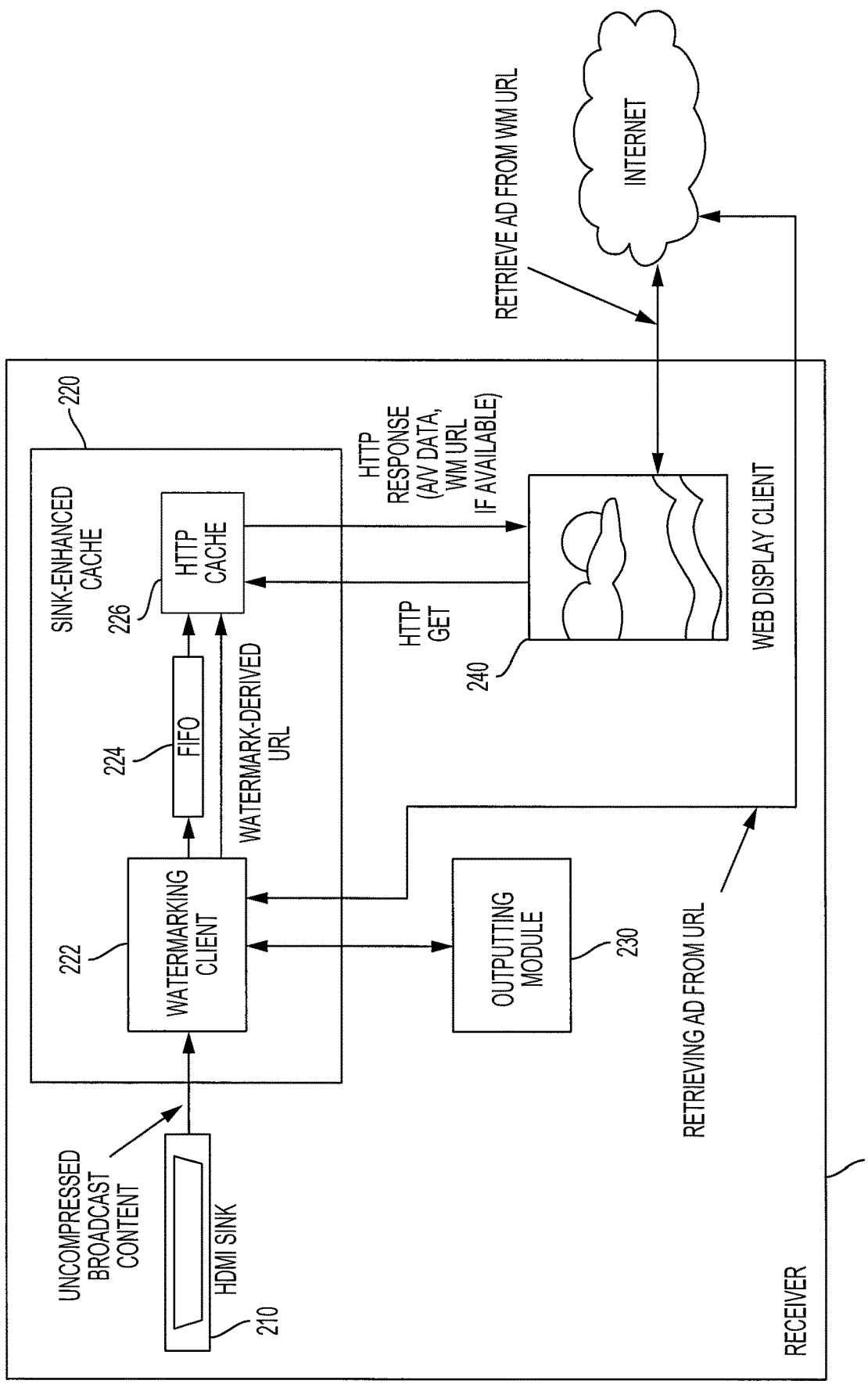
FIG. 2 shows a receiver adapted for processing and outputting of watermarked broadcast content according to one embodiment of the present disclosure.

FIG. 2 shows a receiver (end device) 202 adapted for processing and outputting of watermarked broadcast content according to one embodiment of the present disclosure. The receiver 202 includes a High-Definition Multimedia Interface (HDMI) sink 210, a sink-enhanced cache 220, an outputting module 230, and a web-based display client application 240. The HDMI sink 210 may be the physical interface which couples the receiver 202 to a source device providing content to the receiver 202, such as STB 108 illustrated in FIG. 1. One of skill in the art would readily recognize that the interface through which the receiver 202 is coupled to the source device need not be HDMI, such as HDMI sink 210. For example, in other embodiments, the interface may include Radio Corporation of America (RCA) connectors or a combination of audio and visual interfaces, while in another embodiment the interface may be wireless. In general, the interface which couples the receiver 202 to a source device may be any interface, wired or wireless, so long as the interface supports the transfer of content between the source device and the receiver 202.

The sink-enhanced cache 220 includes a watermarking client module 222, a first in, first out (FIFO) buffer 224, and an HTTP cache 226. The watermarking client module 222 may be configured to receive, via the HDMI sink 210, uncompressed watermarked broadcast content which may include metadata embedded into the uncompressed broadcast content. The watermarking client module 222 may also be configured to decode the uncompressed broadcast content to extract the metadata from the broadcast content. The watermarking client module 222 may also be configured to transmit the broadcast content to the outputting module 230 to output the broadcast content. In general, the outputting module 230 may be any component capable of outputting video and audio content transferred to it.

The watermarking client module 222 may also be configured to process the metadata extracted from the broadcast content and modify the content transferred to the outputting module 230 so that the receiver 202 may output the broadcast content in collaboration with the extracted metadata. For example, as noted above, metadata may include location information specifying where secondary content to be output in collaboration with the broadcast content is located and timing information specifying the time when the secondary content is to be output. In some embodiments, the secondary content may include targeted advertisements, but generally may include any content different than the primary media content already being output by the outputting module 230. Therefore, based on processing of the metadata, the receiver 202 may output the broadcast content in collaboration with the metadata by outputting the broadcast content and then switching to outputting of the secondary content, such as an advertisement, at time instants specified by the metadata.

In some embodiments, the location information may include a uniform resource locator (URL). Therefore, as illustrated in the embodiment of FIG. 2, the secondary content may be retrieved by the receiver 202 over the Internet based on the location information in the metadata that specifies where the secondary content is located, such as a URL.

As illustrated in the embodiment of FIG. 2, the receiver 202 also includes a web-based display client application 240 also capable of outputting the broadcast content in collaboration with the extracted metadata. In order for the web-based client 240 to be able to render the content, the watermarking client module 222 may make the decoded uncompressed broadcast content and the metadata extracted from the broadcast content available to the web-based client 240 in a format readable by the web-based client. For example, as illustrated in the embodiment of FIG. 2, the watermarking client module 222 may store the decoded uncompressed broadcast content and the extracted metadata as markup language content, such as HyperText Markup Language 5 (HTML5) content, within the HTTP cache 226. In other embodiments, the decoded uncompressed broadcast content and the extracted metadata may be stored as XML Linking Language (XLink) content. In general, one of skill in the art will readily recognize that the uncompressed broadcast content and the extracted metadata may be stored in the HTTP cache 226 as any content capable of being transferred to and processed by the web-based client application 240.

As illustrated in the embodiment of FIG. 2, the decoded uncompressed broadcast content may be transferred from the watermarking client module 222 to the HTTP cache 226 via FIFO buffer 224. The extracted metadata that includes the timing information, location information, such as a URL, and possibly other signaling information related to the associated media content may be transferred separately, that is not within the FIFO buffer 224. One of skill in the art would readily recognize that the transfer of the decoded uncompressed broadcast content and the associated metadata need not be transferred exactly as illustrated in FIG. 2, as in other embodiments both may be transferred via the same buffer, while in yet other embodiments both may be transferred wirelessly.

With the broadcast content and the associated metadata stored in the HTTP cache 226, the web-based client 240 may access the HTTP cache to output the broadcast content in collaboration with the extracted metadata. For example, when the web-based client 240 issues an HTTP GET or similar command to access the broadcast content and metadata stored in the HTTP cache, an HTTP response may respond by transferring to the web-based client 240 the decoded uncompressed broadcast content and the metadata to output by the web-based client 240 the broadcast content in collaboration with the extracted metadata. In some embodiments, the metadata may be transferred as a custom header in the HTTP response. As noted previously, metadata may include location information specifying where secondary content to be output in collaboration with the broadcast content is located and timing information specifying the time when the secondary content is to be output. More specifically, in some embodiments, the metadata may include a URL indicating from where the advertisement can be fetched, and timing information indicating when the advertisement should be displayed. Based on processing of the metadata, the web-based client 240 may output the broadcast content in collaboration with the metadata by outputting the broadcast content and then switching to outputting of the secondary content, such as an advertisement, at time instants specified by the metadata. The base URL of the secondary content to be inserted may include an EIDR (http://eidr.org/) identifier or Ad-ID (http://www.ad-id.org) identifier. For example, as illustrated in the embodiment of FIG. 2, the secondary content may be retrieved by the receiver 202 over the Internet based on the location information in the metadata that specifies where the secondary content is located, such as a URL.

Although FIG. 2 illustrates that the cache used for storing the content used by the web-based application is HTTP cache 226, the cache may be of a type other than HTTP without departing from this disclosure in scope or spirit. That is, the cache may, in general, be any cache which stores content to be transferred to a web-based application via a file transfer protocol now known or later developed within the file transfer protocol arts which permits transfer of files over the Internet. Accordingly, the content stored in a cache accessible by the web-based client application need only be stored in a form capable of being transferred to the web-based client application 240 using a file transfer protocol and capable of being processed by the web-based client application 240.

Figure 3:
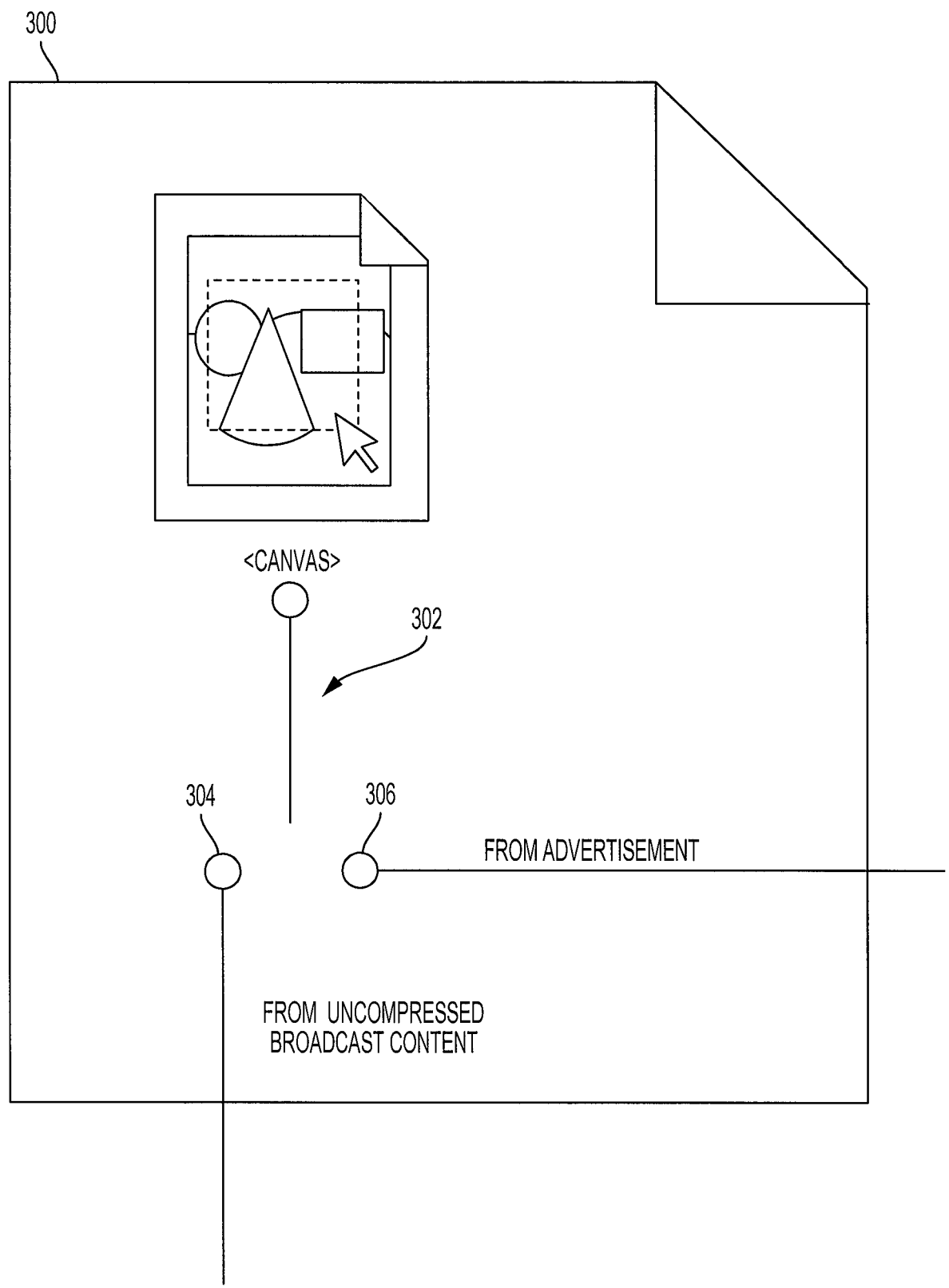
FIG. 3 shows an illustration of output switching between primary media content and secondary content according to one embodiment of the present disclosure.

As an example of collaborative outputting of media content, FIG. 3 shows an illustration of output switching between primary media content and secondary content according to one embodiment of the present disclosure. As shown in the embodiment of FIG. 3, the collaborative outputting may be conceptualized as a switch 302. When the primary media content is being output, the switch 302 may be coupled to node 304 which transfers the decoded uncompressed broadcast content to the web-based client application 300, such as web-based client 240 illustrated in FIG. 2, for outputting. When the secondary content is being output, the switch 302 may be coupled to node 306 which transfers the secondary content, such as an advertisement, to the web-based client application 300 for outputting. Although in the embodiment of FIG. 3, the web-based client 300 may output the broadcast content in collaboration with the metadata using the <canvas> element of HTML5, other rendering elements than <canvas>, such as scalable vector graphics rendering elements, may be used without departing from this disclosure in scope or spirit.

Figure 4A:
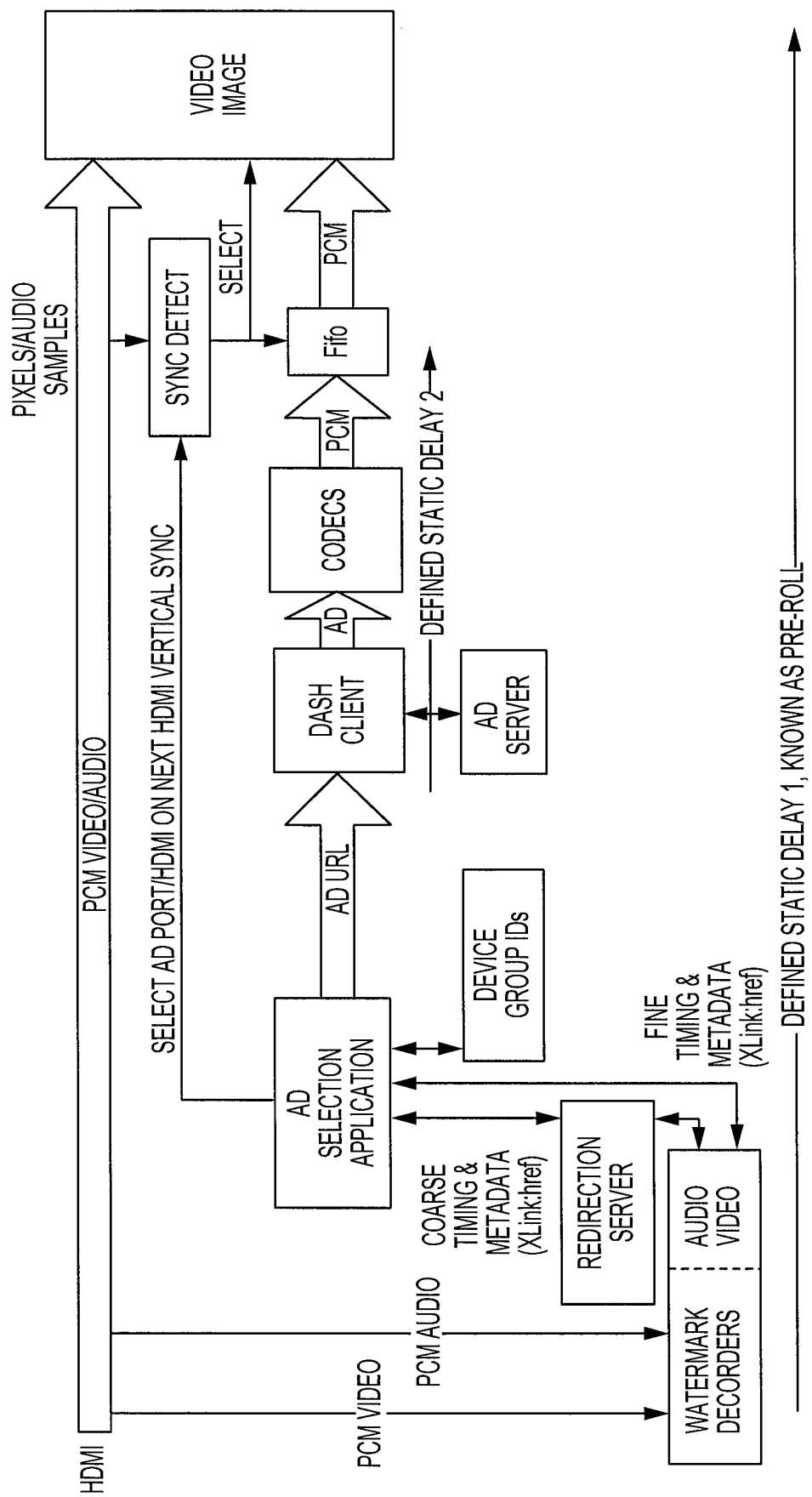
FIG. 4A shows a block diagram illustration of a process for inserting advertisements into the output of primary media content being output according to one embodiment of the present disclosure.

FIG. 4A shows a block diagram illustration of a process for inserting advertisements into the output of primary media content according to one embodiment of the present disclosure. In other words, FIG. 4A may illustrate an embodiment for advertisement insertion into the output of primary media content which may consist of a frame-accurate switch between two video sources.

As illustrated in FIG. 4A, in some embodiments, a dynamic adaptive streaming over HTTP (DASH) adaptive bitrate streaming technique may be employed by an end device (receiver) to implement aspects of the disclosure. For example, URLs may be used to identify DASH Media Presentation Description (MPD) files. In some embodiments, XLink may be used to store the metadata that triggers the selection of secondary content, such as advertisements. According to an embodiment, an end device disclosed herein may start a web-based application to begin outputting of broadcast content and processing of metadata. Therefore, the end device may include a combination of hardware and/or software which allows the end device to identify the application to be started and to obtain a signature for the application from the metadata delivered in or after the discovery of the watermark content within the received broadcast content. In some embodiments, there may be one or more redirections ahead of the metadata being delivered.

In some embodiments, the end device may also include software and/or hardware to deliver to the web-based application relevant XLink content that otherwise may have been discovered in the MPD. This may allow the web-based application to directly identify the URL of a candidate URL. In some embodiments, the identification may include disclosure of Group IDs or essentially the same information in the form of applicable attributes.

According to some embodiments, the end device may also include software and/or hardware to synchronize frames from the secondary content to the resolution of the vertical frame rate to make sure that the jitter is less than a frame duration peak to peak. The end device may also include software and/or hardware to adjust the time resolution to be less than video line accuracy. The end device may also include software and/hardware to fetch the relevant MPD based on the known time, such as by fetching based on a URL that identifies the MPD. In some embodiments, this may be done via broadband MVPD or the device. For example, it can be done by the device if there is a defined way to reference it on the device and broadcast access is present.

In some embodiments, the end device may also include software and/or hardware which uses MPD information to allow the configuration of the DASH player On Demand parameters. The MPD information may also be used to set up the DASH client to work in a known manner in accordance with the advertisement insertion scheme specified in the metadata. In some embodiments, the MPD information may be delivered via broadcast.

Metadata embedded in the broadcast content for outputting of broadcast content (e.g., redistributed broadcast content) and secondary content (e.g., advertisements and/or other media content) according to some embodiments includes location information and timing information specified in the metadata. The location information may include any information for identifying, accessing, and/or obtaining the secondary content. For example, the location information of some embodiments may include the minimum information necessary to retrieve the secondary content, such as a URL identifying the location of the secondary content. The timing information may include any information for establishing a time for playback (outputting) the secondary content, or from which a time for playback (outputting) the secondary media may be determined. For example, the timing information of some embodiments may include an absolute time reference (e.g., a "wall clock" time) or may be relative timing information.

In some embodiments, such as the embodiments illustrated in FIGS. 2 and 4, the timing information specified in the metadata may be relative timing information, such as time relative to the media content or generally any time instant associated with an operation performed on the media content or embedded metadata by the end device. In other words, the timing information need not be referenced to an absolute time reference, such as a wall clock. For example, as noted previously, metadata may include location information specifying where secondary content, such as an advertisement, to be output in collaboration with the broadcast (media) content is located and timing information establishing a time when the secondary content is to be output (e.g., a time relative to an established time line for the broadcast content, a time relative to a portion of the broadcast content, a time relative to an operation performed by the computing device with respect to the broadcast content, a time relative to an operation performed by the computing device with respect to the embedded metadata, etc.). The timing information may include the time for outputting of the secondary content in relation to the reception time of the watermark. For example, as noted with reference to FIG. 2, the receiver 202 may include a watermarking client module 222 that decodes the uncompressed broadcast content to extract the metadata from the broadcast content. In one embodiment, the receiver may identify the time when the broadcast content that has the watermark embedded into it was received as the time from which the timing information provided in the extracted metadata is referenced. In another embodiment, the receiver may identify the time when the watermarked metadata is extracted from the broadcast content as the time from which the timing information provided in the extracted metadata is referenced.

As shown, generally any time instant associated with the media content or the embedded metadata may be used as the time instant from which the timing information provided in the extracted metadata is referenced. Thus, the timing information in the metadata may indicate that the secondary content should be displayed T seconds following receipt of the watermarked metadata, T milliseconds following extraction of the metadata from the broadcast content, or any other variation of time units referenced to a time instant associated with either the media content or the metadata.

In some embodiments, parts of or the whole of the metadata may be received by a receiver via a means other than extraction from the received broadcast media content. For example, portions of or the entire metadata information may be lost in communication and require recovery. In some embodiments, the location information associated with the secondary content may be transmitted to the receiver device as an XLink message delivered, for example, via an MPD or directly through an advertisement selection application, such as the Ad Selection Application illustrated in FIG. 4A. In other embodiments, portions of or the entire metadata may be received via unicast or broadband means.

In some embodiments, the metadata also include other information in addition to location and timing information. For example, in some embodiments, the metadata may include the current station (media content provider station) time, such as when the watermark was made. The metadata may also include the current MPD at the current station time and the time when the current MPD went valid in the station time. If there is a pending XLink, such as if there is an advertisement avail that requires resolution of an XLink, then the metadata may include the XLink.

In some embodiments, an end device may define a time line for the playback (output) of media. For example, FIG. 4B shows a playback (output) time line of primary media content and secondary content according to one embodiment of the present disclosure. According to an embodiment, an end device may define a time line for the playback of media by linking the actual period boundary it observes via pre-roll data and the MPD. In at least one embodiment, the period may start with a Random Access Point (RAP) and the watermarked content may be sent entirely after the start of the RAP is encoded. The end device may be notified of an active pre-roll and the end device may use the distance to the next period start to establish the current playback time on its interface, such as its HDMI. Because of a delay in the delivery, the time may not be current UTC, but may rather be the point in time the receiver infers that it should play.

In view of exemplary systems shown and described herein, methodologies that may be implemented in accordance with the disclosed subject matter will be better appreciated with reference to various functional block diagrams. While, for purposes of simplicity of explanation, methodologies are shown and described as a series of acts/blocks, it is to be understood and appreciated that the claimed subject matter is not limited by the number or order of blocks, as some blocks may occur in different orders and/or at substantially the same time with other blocks from what is depicted and described herein. Moreover, not all illustrated blocks may be required to implement methodologies described herein. It is to be appreciated that functionality associated with blocks may be implemented by various aspects of the systems disclosed herein.

Figure 5:
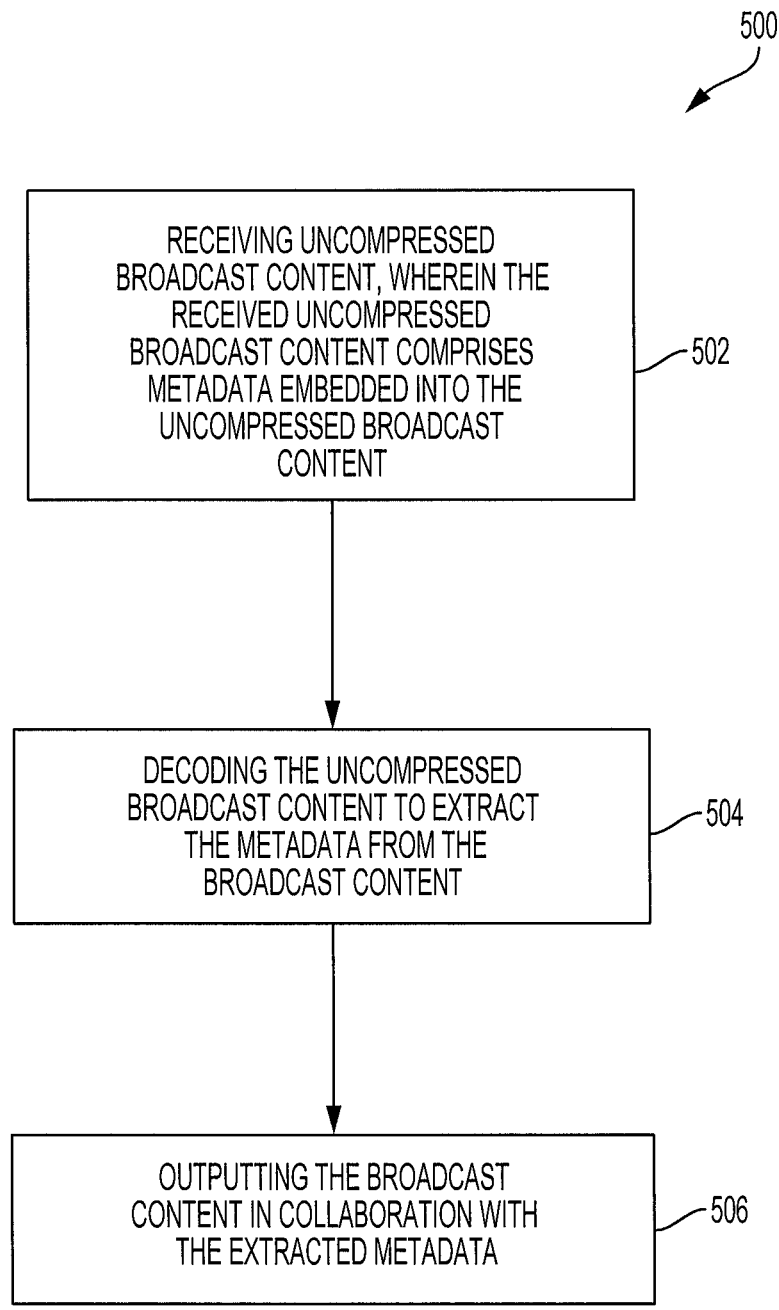
FIG. 5 shows a flow diagram illustrating a method for handling and outputting broadcast content and secondary content based on metadata embedded in the broadcast content according to one embodiment of the disclosure.

FIG. 5 shows a flow diagram illustrating a method for handling and outputting broadcast content and secondary content based on metadata embedded in the broadcast content according to one embodiment of the disclosure. It is noted that embodiments of method 500 may be implemented in accordance with the systems and embodiments described above with respect to FIGS. 1-4. For example, embodiments of method 500 may be implemented by end device receiver 110 or 202. In general, embodiments of method 500 may be implemented by other similar systems without deviating from this disclosure so long as the systems, whether directly or indirectly, support the operations as described herein.

Specifically, method 500 of the illustrated embodiments includes, at block 502, receiving, by a computing end device, uncompressed broadcast content, wherein the received uncompressed broadcast content includes metadata embedded into the uncompressed broadcast content. In some embodiments, the metadata includes location information specifying where secondary content to be output in collaboration with the broadcast content is located, timing information specifying the time when the secondary content is to be output, other metadata, or any combination thereof. In other embodiments, the uncompressed broadcast content and the extracted metadata may be stored in an HTTP cache within the end device. Method 500 also includes, at block 504, decoding, by the computing end device, the uncompressed broadcast content to extract the metadata from the broadcast content.

At block 506, method 500 includes outputting, by the computing end device, the broadcast content in collaboration with the extracted metadata. In some embodiments, outputting the broadcast content in collaboration with the metadata includes outputting the broadcast content and then switching to outputting of secondary content at time instants specified by the metadata. In some embodiments, the secondary content is retrieved by the computing device over the Internet based on location information in the metadata that specifies where the secondary content is located.

According to another embodiment, outputting the broadcast content in collaboration with the metadata may include outputting via a web-based client accessing the HTTP cache. For example, outputting via the web-based client may include transferring the broadcast content and the extracted metadata stored in the HTTP cache to the web-based client to output the broadcast content in collaboration with the metadata. In some embodiments, the web-based client may reside on the end device as a client application executing on the end device.

The schematic flow chart diagram of FIG. 5 is generally set forth as a logical flow chart diagram. As such, the depicted order and labeled steps are indicative of one embodiment of the disclosed methods. Other steps and methods may be conceived that are equivalent in function, logic, or effect to one or more steps, or portions thereof, of the illustrated methods. Additionally, the format and symbols employed are provided to explain the logical steps of the methods and are understood not to limit the scope of the methods. Although various arrow types and line types may be employed in the flow chart diagrams, they are understood not to limit the scope of the corresponding methods. Indeed, some arrows or other connectors may be used to indicate only the logical flow of the methods. For instance, an arrow may indicate a waiting or monitoring period of unspecified duration between enumerated steps of the depicted methods. Additionally, the order in which a particular method occurs may or may not strictly adhere to the order of the corresponding steps shown.

In some embodiments, a web-based application, such as the web-based client application described with reference to FIGS. 1-5, may be an application in which all or some parts of the software executed on a computing device are downloaded from the World Wide Web (Web). It may refer to browser-based applications that run within a user's Web browser, or to "rich client" desktop applications that do not use a browser, or to mobile applications that access the Web for additional information. In general, the web-based client may reside on the end device as an application or in the network.

In a browser-based Web application, instructions may be contained within a Web page that is retrieved from a Web site. Combined with HTML code that determines the visual layout and a CSS style sheet, the HTML, instructions, and CSS may be executed via the browser. In addition, processing at the server side often may be performed to access databases and other networks. The data for a Web application may be stored locally or on the Web, or in both locations.

Web-based client applications may also run without the browser. A client program, which is either installed in the user's computer or mobile device or is downloaded each session, may interact with a server on the Web using standard Web protocols. Just like browser-based applications, the data may be stored remotely or locally.

Web-based client applications may also run as mobile applications. Countless mobile applications use the Web for additional information. For example, mobile applications, such as iOS or Android, may install all the text locally in the device but retrieve all the images from a server via Web (HTTP) protocols.

Some embodiments of the above described may be conveniently implemented using a conventional general purpose or a specialized digital computer or microprocessor programmed according to the teachings herein, as will be apparent to those skilled in the computer art. Appropriate software coding may be prepared by programmers based on the teachings herein, as will be apparent to those skilled in the software art. Some embodiments may also be implemented by the preparation of application-specific integrated circuits or by interconnecting an appropriate network of conventional component circuits, as will be readily apparent to those skilled in the art. Those of skill in the art would understand that information and signals may be represented using any of a variety of different technologies and techniques. For example, data, instructions, requests, information, signals, bits, symbols, and chips that may be referenced throughout the above description may be represented by voltages, currents, electromagnetic waves, magnetic fields or particles, optical fields or particles, or any combination thereof.

Some embodiments include a computer program product comprising a computer-readable medium (media) having instructions stored thereon/in and, when executed (e.g., by a processor), perform methods, techniques, or embodiments described herein, the computer readable medium comprising sets of instructions for performing various steps of the methods, techniques, or embodiments described herein. The computer readable medium may comprise a storage medium having instructions stored thereon/in which may be used to control, or cause, a computer to perform any of the processes of an embodiment. The storage medium may include, without limitation, any type of disk including floppy disks, mini disks (MDs), optical disks, DVDs, CD-ROMs, micro-drives, and magneto-optical disks, ROMs, RAMs, EPROMs, EEPROMs, DRAMs, VRAMs, flash memory devices (including flash cards), magnetic or optical cards, nanosystems (including molecular memory ICs), RAID devices, remote data storage/archive/warehousing, or any other type of media or device suitable for storing instructions and/or data thereon/in. Additionally, the storage medium may be a hybrid system that stored data across different types of media, such as flash media and disc media. Optionally, the different media may be organized into a hybrid storage aggregate. In some embodiments different media types may be prioritized over other media types, such as the flash media may be prioritized to store data or supply data ahead of hard disk storage media or different workloads may be supported by different media types, optionally based on characteristics of the respective workloads. Additionally, the system may be organized into modules and supported on blades configured to carry out the storage operations described herein.

Stored on any one of the computer readable medium (media), some embodiments include software instructions for controlling both the hardware of the general purpose or specialized computer or microprocessor, and for enabling the computer or microprocessor to interact with a human user and/or other mechanism using the results of an embodiment. Such software may include without limitation device drivers, operating systems, and user applications. Ultimately, such computer readable media further includes software instructions for performing embodiments described herein. Included in the programming (software) of the general-purpose/specialized computer or microprocessor are software modules for implementing some embodiments.

Those of skill would further appreciate that the various illustrative logical blocks, modules, circuits, and algorithm steps described in connection with the disclosure herein may be implemented as electronic hardware, computer software stored on a computing device and executed by one or more processing devices, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The techniques or steps of a method described in connection with the embodiments disclosed herein may be embodied directly in hardware, in software executed by a processor, or in a combination of the two. In some embodiments, any software module, software layer, or thread described herein may comprise an engine comprising firmware or software and hardware configured to perform embodiments described herein. In general, functions of a software module or software layer described herein may be embodied directly in hardware, or embodied as software executed by a processor, or embodied as a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium may be coupled to the processor such that the processor can read data from, and write data to, the storage medium. In the alternative, the storage medium may be integral to the processor. The processor and the storage medium may reside in an ASIC. The ASIC may reside in a user device. In the alternative, the processor and the storage medium may reside as discrete components in a user device.

While the embodiments described herein have been described with reference to numerous specific details, one of ordinary skill in the art will recognize that the embodiments can be embodied in other specific forms without departing from the spirit of the embodiments. Thus, one of ordinary skill in the art would understand that the embodiments described herein are not to be limited by the foregoing illustrative details, but rather are to be defined by the appended claims.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present disclosure, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A method for outputting broadcast content based on metadata embedded in the broadcast content, comprising:
   receiving, by a computing device, broadcast content, wherein the received broadcast content comprises metadata embedded into the broadcast content and location information specifying where secondary content is located, wherein the metadata comprises timing information establishing timing for outputting the secondary content, and wherein the timing information is relative timing information selected from the group consisting of timing information relative to an established time line for the broadcast content, timing information relative to a portion of the broadcast content, timing information relative to an operation performed by the computing device with respect to the broadcast content, and timing information relative to an operation performed by the computing device with respect to the embedded metadata;
   decoding, by the computing device, the broadcast content to extract the metadata from the broadcast content;
   retrieving the secondary content from a location specified by the location information;

synchronizing frames from the secondary content to a resolution of a frame rate of the broadcast content in order that jitter is less than a frame duration peak to peak; and outputting, by the computing device, the broadcast content and switching between outputting the broadcast content and outputting of the secondary content, retrieved from the location specified by the location information, at time instances specified by the extracted metadata.

2. The method of claim 1, wherein the secondary content is retrieved by the computing device over the Internet based on the location information in the metadata that specifies where the secondary content is located.

3. The method of claim 1, further comprising:
establishing a coarse timing for outputting the secondary content based on the timing information of the metadata, wherein outputting the broadcast content in collaboration with the metadata comprises outputting the broadcast content and then switching to outputting of the secondary content at a time instant based at least in part on the coarse timing.

4. The method of claim 3 further comprising:
establishing a fine timing for outputting the secondary content based on a frame rate resolution of the broadcast content, wherein outputting the broadcast content in collaboration with the metadata comprises outputting the broadcast content and then switching to outputting of the secondary content at a time instant based on the coarse timing and the fine timing.

5. The method of claim 1, further comprising:
storing the broadcast content and the extracted metadata in Hypertext Transfer Protocol (HTTP) cache within the computing device,
wherein outputting the broadcast content in collaboration with the metadata comprises outputting via a web-based client accessing the HTTP cache.

6. The method of claim 5, wherein outputting via the web-based client comprises transferring the broadcast content and the extracted metadata stored in the HTTP cache to the web-based client to output the broadcast content in collaboration with the metadata.

7. The method of claim 5, wherein the web-based client is a client application executing on the computing device.

8. The method of claim 5, wherein an advertisement selection and insertion application operable to provide the outputting the broadcast content in collaboration with the extracted metadata is installed in the computing device.

9. A computer program product for outputting broadcast content based on metadata embedded in the broadcast content, comprising:
a non-transitory computer-readable medium comprising instructions which, when executed by a processor of a computing system, cause the processor to perform the steps of:
receiving broadcast content, wherein the received broadcast content comprises metadata embedded into the broadcast content and location information specifying where secondary content is located, wherein the metadata comprises timing information establishing timing for outputting the secondary content, and wherein the timing information is relative timing information selected from the group consisting of timing information relative to an established time line for the broadcast content, timing information relative to a portion of the broadcast content, timing information relative to an operation performed by the computing system with respect to the broadcast content, and timing information relative to an operation performed by the computing system with respect to the embedded metadata;
decoding the broadcast content to extract the metadata from the broadcast content;
retrieving the secondary content from a location specified by the location information;
synchronizing frames from the secondary content to a resolution of a frame rate of the broadcast content in order that jitter is less than a frame duration peak to peak; and
outputting the broadcast content and switching between outputting the broadcast content and outputting of the secondary content, retrieved from the location specified by the location information, at time instances specified by the extracted metadata.

10. The computer program product of claim 9, wherein the secondary content is retrieved by the computing system over the Internet based on the location information in the metadata that specifies where the secondary content is located.

11. The computer program product of claim 9, wherein the instructions further cause the processor to perform the step of:
establishing a coarse timing for outputting the secondary content based on the timing information of the metadata, wherein outputting the broadcast content in collaboration with the metadata comprises outputting the broadcast content and then switching to outputting of the secondary content at a time instant based at least in part on the coarse timing.

12. The computer program product of claim 11, wherein the instructions further cause the processor to perform the step of:
establishing a fine timing for outputting the secondary content based on a frame rate resolution of the broadcast content, wherein outputting the broadcast content in collaboration with the metadata comprises outputting the broadcast content and then switching to outputting of the secondary content at a time instant based on the coarse timing and the fine timing.

13. The computer program product of claim 9, wherein medium further comprises instructions which, when executed by a processor of a computing system, cause the processor to perform the step of storing the broadcast content and the extracted metadata in Hypertext Transfer Protocol (HTTP) cache within the computing system, wherein outputting the broadcast content in collaboration with the metadata comprises outputting via a web-based client accessing the HTTP cache.

14. The computer program product of claim 13, wherein outputting via the web-based client comprises transferring the broadcast content and the extracted metadata stored in the HTTP cache to the web-based client to output the broadcast content in collaboration with the metadata.

15. The computer program product of claim 13, wherein the web-based client is a client application executing on the computing system.

16. The computer program product of claim 13, wherein the instructions comprise an advertisement selection and insertion application operable to provide the outputting the broadcast content in collaboration with the extracted metadata.

17. An apparatus for outputting broadcast content based on metadata embedded in the broadcast content, comprising:

means for receiving broadcast content by a computing device, wherein the received broadcast content comprises metadata embedded into the broadcast content, wherein the metadata comprises timing information establishing a time for outputting secondary content and location information specifying where the secondary content is located, wherein the timing information is relative timing information selected from the group consisting of timing information relative to an established time line for the broadcast content, timing information relative to a portion of the broadcast content, timing information relative to an operation performed by the computing device with respect to the broadcast content, and timing information relative to an operation performed by the computing device with respect to the embedded metadata;

means for decoding the broadcast content to extract the metadata from the broadcast content;

means for retrieving the secondary content from a location specified by the location information;

means for synchronizing frames from the secondary content to a resolution of a frame rate of the broadcast content in order that jitter is less than a frame duration peak to peak; and means for outputting the broadcast content and switching between outputting the broadcast content and outputting of the secondary content, retrieved from the location specified by the location information, at time instances specified by the extracted metadata.

18. The apparatus of claim 17, wherein the secondary content is retrieved by the computing device over the Internet based on the location information in the metadata that specifies where the secondary content is located.

19. The apparatus of claim 17, further comprising:
means for establishing a coarse timing for outputting the secondary content based on the timing information of the metadata, wherein the means for outputting the broadcast content in collaboration with the metadata comprises means for outputting the broadcast content and then switching to outputting of the secondary content at a time instant based at least in part on the coarse timing.

20. The apparatus of claim 19, further comprising:
means for establishing a fine timing for outputting the secondary content based on a frame rate resolution of the broadcast content, wherein the means for outputting the broadcast content in collaboration with the metadata comprises means for outputting the broadcast content and then switching to outputting of the secondary content at a time instant based on the coarse timing and the fine timing.

21. The apparatus of claim 17, further comprising:
means for storing the broadcast content and the extracted metadata in Hypertext Transfer Protocol (HTTP) cache within the computing device, wherein means for outputting the broadcast content in collaboration with the metadata comprises means for outputting via a web-based client accessing the HTTP cache.

22. The apparatus of claim 21, wherein the means for outputting via the web-based client comprises means for transferring the broadcast content and the extracted metadata stored in the HTTP cache to the web-based client to output the broadcast content in collaboration with the metadata.

23. The apparatus of claim 21, wherein the web-based client is a client application executing on the computing device.

24. The apparatus of claim 21, wherein an advertisement selection and insertion application provides the means for outputting the broadcast content in collaboration with the extracted metadata.

* * * * *